(12) United States Patent
Yadav et al.

(10) Patent No.: US 9,948,337 B2
(45) Date of Patent: Apr. 17, 2018

(54) PACKAGED INTRINSIC SAFE INDUSTRIAL MODEM

(71) Applicant: Honeywell International Inc., Morris Plains, NJ (US)

(72) Inventors: Ajit Yadav, Hyderabad (IN); Murali Thavva. V. V, Hyderabad (IN); Murali Krishna Bezawada, Hyderbad (IN); John Boettger, Rockledge, FL (US)

(73) Assignee: Honeywell International Inc., Morris Plains, NJ (US)

( * ) Notice: Subject to any disclaimer, the term of this patent is extended or adjusted under 35 U.S.C. 154(b) by 30 days.

(21) Appl. No.: 15/060,201

(22) Filed: Mar. 3, 2016

(65) Prior Publication Data

US 2017/0257130 A1   Sep. 7, 2017

(51) Int. Cl.
*H04B 1/38* (2015.01)
*H04B 1/3818* (2015.01)

(52) U.S. Cl.
CPC .................................. *H04B 1/3818* (2015.01)

(58) Field of Classification Search
CPC .... G09G 3/06; G09G 2300/0426; G09G 3/32; F21V 15/01; F21V 23/06; F21V 31/005; H05K 5/064; Y10T 29/49128
See application file for complete search history.

(56) References Cited

U.S. PATENT DOCUMENTS

| 3,969,143 | A | 7/1976 | Mead et al. |
| 8,125,785 | B2 | 2/2012 | Nelson et al. |
| 8,185,101 | B1 | 5/2012 | Wiseman et al. |
| 8,674,539 | B1* | 3/2014 | Magin ................. H02J 13/0044 307/1 |
| 9,052,092 | B2 | 6/2015 | Wendler et al. |
| 9,059,538 | B2 | 6/2015 | Showcatally et al. |
| 9,374,255 | B1* | 6/2016 | Malhan .................... H04B 3/54 |
| 2002/0185530 | A1* | 12/2002 | Jung ................. H04M 1/72522 235/382 |
| 2009/0143111 | A1* | 6/2009 | Oglesbee ................. H04B 1/04 455/572 |
| 2011/0315779 | A1* | 12/2011 | Bidin ............... G06K 19/07745 235/492 |
| 2014/0200047 | A1* | 7/2014 | Chen ...................... H04B 1/406 455/558 |
| 2014/0231664 | A1 | 8/2014 | Howe |
| 2015/0065205 | A1* | 3/2015 | Webber ................ H04B 1/1607 455/574 |
| 2015/0366084 | A1* | 12/2015 | Arul ..................... H01R 43/005 361/752 |

* cited by examiner

*Primary Examiner* — Liton Miah
(74) *Attorney, Agent, or Firm* — Jetter & Associates, P.A.

(57) ABSTRACT

A packaged cellular modem system includes a capacitor for receiving power from a DC power source, a DC-to-DC converter coupled to capacitor electrodes, a cellular modem coupled to the converter output and to an antenna, and an IS barrier circuit coupled to a modem output. A microcontroller coupled to a boost regulator has its output coupled to electrodes. A metrology jumper is between the microcontroller and ground. An encapsulation material provides a potted area for the capacitor, converter, modem, IS barrier circuit and microcontroller. A SIM card is coupled to the modem by the IS barrier circuit. LED's are coupled to the microcontroller. The SIM card and LEDs are in a non-potted area. A transparent SIM card access cover over the SIM card and LEDs enables exposing the SIM card.

15 Claims, 5 Drawing Sheets

PACKAGED INTRINSIC SAFE INDUSTRIAL MODEM

FIELD

Disclosed embodiments relate to packaged intrinsic safe industrial modems.

BACKGROUND

A modulator-demodulator (modem) is a hardware device including a transceiver which modulates one or more carrier wave signals to encode digital information for transmission and demodulates modulated signals to decode transmitted information. A modem produces a signal that can be transmitted easily and decoded to reproduce the original digital data. Modems can be used with a variety of transmitters of analog signals, such as a cellular radio. A common type of modem converts the digital data of a computer into modulated electrical signal for transmission over telephone lines and demodulated by another modem at the receiver side to recover the digital data.

Modems can be used in one wireless modem application to synchronize gas meter reading and interval data to meter data management systems and AutoSol Enterprise Server (AES) software. It can also add significant value to those involved in energy measurement for billing, trading, load management, distribution engineering and custody transfer.

An industrial modem for the gas industry may comprise a multi-band LTE, UMTS/HSPA and CDMA/1XRTT digital cellular radio, cellular packet switched (IP) connectivity providing the lowest current cost communications available. Such industrial modems support operation with static or dynamic IP addresses, DES based encryption for secure IP access, over-the-air (OTA) download of operating system and configuration provides future-proofing, and programmable interval sizes: 1, 5, 15, 30, 60 min. Depending on data input configuration user defined digital outputs maybe available to provide pulse outputs or control signals to customers. The industrial modem includes a Subscriber Identity Module (SIM) card, where the electronics assembly is potted by an encapsulation material (an epoxy) to meet an Intrinsic Safe Zone 0 safety requirement.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments recognize for conventional packaged industrial modems the Subscriber Identity Module (SIM) card is potted and thus not accessible to enable replacing the SIM card, changing the cellular service provider or getting to view the subscriber identity module ICCID number. The subscriber identity module ICCID number is usually needed by the cellular provide when the cellular account is first established. The conventional SIM card trap door needs to be cut and removed to access the SIM card.

As described above, the electronics assembly is encapsulated to meet the Intrinsic Safe Zone 0 requirement. Accordingly, one is not able to replace the SIM card once the electronics assembly is potted, or to change the service provider. Moreover, there is no access to the metrological jumper for enabling modem configuration without disassembling the electronics assembly from the enclosure. It is also recognized to ease of operation all input/output (IO) connections should be accessible all from one side of modem.

One disclosed embodiment comprises a packaged cellular modem system comprising a printed circuit board (PCB) upon which the cellular modem system is configured on. At least one capacitor has electrodes coupled for receiving power from a DC power source, a DC-to-DC converter has inputs coupled to the electrodes of the capacitor, a cellular modem is coupled to an output of the DC-to-DC converter and to an antenna through a first intrinsic safety (IS) barrier circuit, and a second IS barrier circuit is coupled to an output of the cellular modem.

A microcontroller control section including a microcontroller is coupled to a boost regulator having an output coupled to the electrodes of the capacitor for receiving power. Another IS barrier circuit and a metrology jumper is coupled between the microcontroller and a ground pin of the modem system.

Input/output (IO) connectors are coupled to the modem. An encapsulation material provided a potted area of the PCB pots the capacitor, DC-to-DC converter, cellular modem, second IS safe barrier circuit, and the microcontroller control section. A SIM card inserted into a SIM connector is coupled to the modem and to the second IS barrier circuit, and LED's are coupled to the microcontroller are in a non-potted area of the PCB. A visible light transparent SIM card access cover (transparent cover) is over the SIM card and over the LEDs having a hinge pivoted to the encapsulation material for lifting the transparent cover to expose the SIM card for providing access thereto.

DETAILED DESCRIPTION

Figure 1:
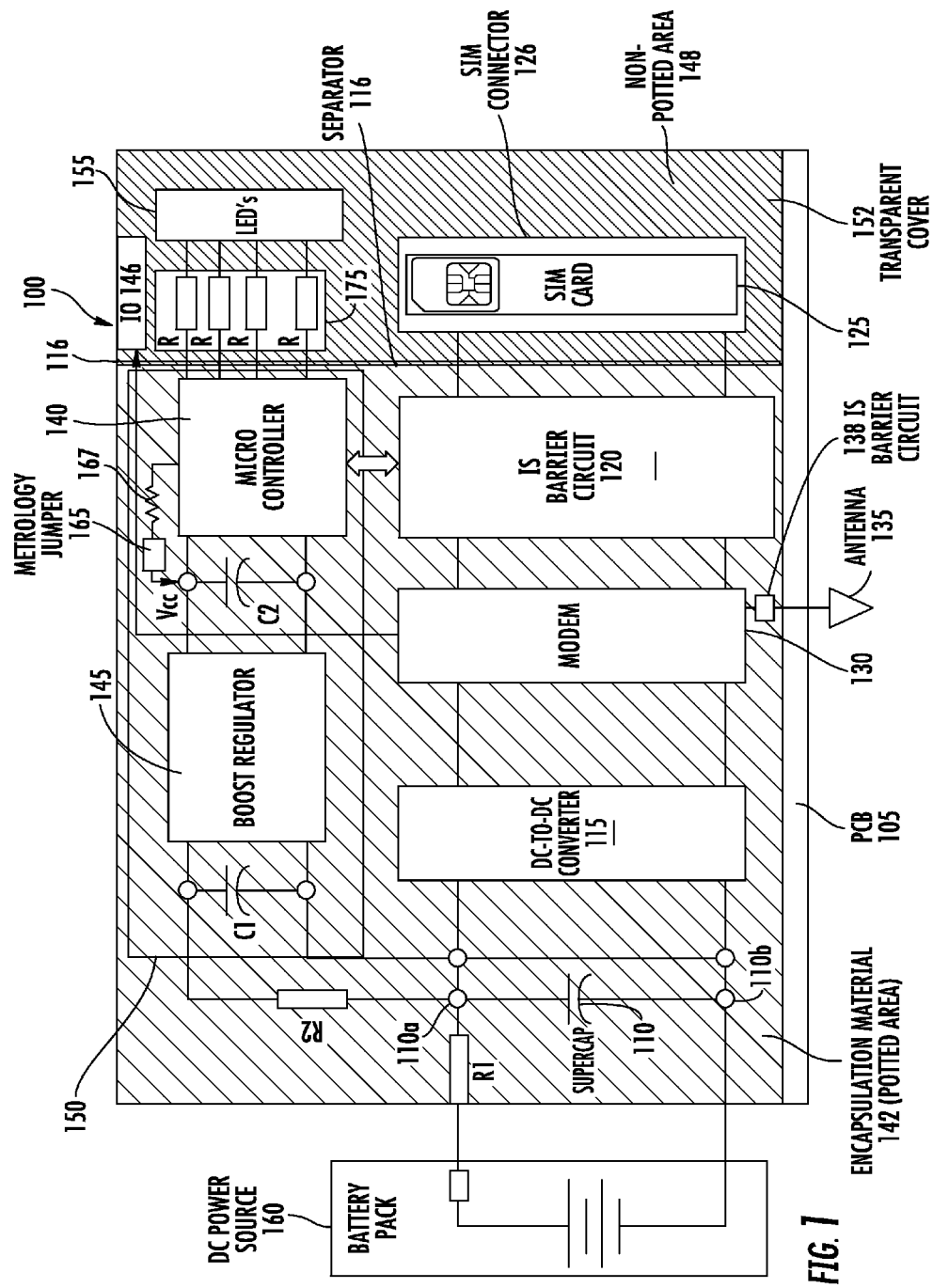
FIG. 1 is a block diagram representation of an example model PCB assembly for a cellular modem system, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Also, the terms "coupled to" or "couples with" (and the like) as used herein without further qualification are intended to describe either an indirect or direct electrical connection. Thus, if a first device "couples" to a second device, that connection can be through a direct electrical connection where there are only parasitics in the pathway, or through an indirect electrical connection via intervening items including other devices and connections. For indirect coupling, the intervening item generally does not modify the information of a signal but may adjust its current level, voltage level, and/or power level.

FIG. 1 is a block diagram representation of an example cellular modem system (modem system) 100. Modem system 100 includes a printed circuit board (PCB) 105. There is at least one capacitor 110 (e.g. a supercapacitor) having electrodes 110a, 110b coupled for receiving power from an external DC power source 160, such as the battery pack shown. The DC power source 160 may also comprise a single battery, a fuel cell, or a solar cell. DC power source 160 always has current flowing in the same direction between its two terminals.

As used herein, a "supercapacitor" (sometimes also referred to as an ultracapacitor, previously an electric double-layer capacitor (EDLC)) is a high-capacity electrochemical capacitor that instead of storing electrical charge directly in dielectric materials as with conventional capacitors, use electrolyte ions which create charge storage in electrical double layers. A supercapacitor provides high-capacity with capacitance values much higher than other capacitors (but generally lower voltage limits), which typically store 10 to 100 times more energy per unit volume or mass compared to electrolytic capacitors. Supercapacitors are available commercially, such as the HLC-1550 from Tadiran Batteries North New Hyde Park, N.Y.

Modem system 100 includes a DC-to-DC converter 115 having inputs coupled to the electrodes 110a, 110b of the capacitor 110. The cellular modem 130 is coupled to receive power from an output of the DC-to-DC converter 115 and is coupled to an antenna 135 through an ISW barrier circuit 138 (e.g., DC blocking capacitors). The cellular modem 130 may be a Multi-band UMTS/HSPA and CDMA/1XRTT digital cellular radio, Cellular packet switched (IP) connectivity, supports operation with static or dynamic IP addresses, DES-based encryption for secure IP access; Over-the-air (OTA) download of operating system and configuration provides future-proofing, programmable interval sizes: 1, 5, 15, 30, 60 min. Depending on data input configuration user defined digital outputs maybe available to provide pulse outputs or control signals to customers. For gas meter applications for connectivity and communication the modem with SIM interface are needed to connect the gas meter and transfer data to data center for billing and custody transfer.

A second IS barrier circuit 120 (e.g., infallible resistors, Zener diodes, and/or active barriers) functioning as a SIM interface circuit is coupled to an output of the cellular modem 130. Active barriers include transistors and/or amplifiers (e.g., op amps). Infallible resistors are film type resistors, so that they are generally able to withstand at least 1.5× of worst case fault power. A film resistor as used herein is its conventional meaning referring to different film types such as carbon film, metal film, and metal oxide film resistors. Film resistors are generally manufactured by depositing pure metals (e.g., nickel) or oxide film (e.g., tin-oxide) onto an insulating ceramic or substrate, so that the conductive material does not contain binders or insulating material. This design makes film resistors qualified as infallible resistors.

System 100 includes a microcontroller control section 150 including a microcontroller 140 coupled to a boost regulator 145 having an output coupled to the electrodes 110a, 110b of the capacitor 110. The microcontroller 140 is coupled to electrode 110a of the capacitor 110 to receive protected power through R2. A metrology jumper 165 is coupled between the microcontroller 140 and a ground of the system through an infallible resistor 167. The function of the metrology jumper 165 is to enable changing the metrology related configuration parameters, where the microcontroller 140 senses a break of a shorting bar across the metrology jumper 165 by breaking its seal (as described below) and then removing the short across the metrology jumper terminals.

Input/output (IO) connectors 146 are coupled to the modem 130. The IO connectors 146 can include an IO pin for receiving data signals, a first SIM reset (RST) pin, core power supply (VCC) pin, a clock (CLK) pin, a battery power supply (VBAT) pin, and SIM side pins including at least a VCC pin, a SIM CLK pin, second SIM RST pin, and a SIM IO pin, as well as and a ground (GND) pin. An encapsulation material 142 (such as an epoxy) is for providing a potted area of the PCB potting the capacitor 110, the DC-to-DC converter 115, the cellular modem 130, the second IS barrier circuit 120 and the microcontroller control section 150 including over the PCB 105 in those sections of the board area. The encapsulation material 142 allows the modem system 100 to meet the Intrinsic Safe Zone 0 requirement.

A Subscriber Identity Module (SIM) card 125 inserted into a SIM card connector 126 is coupled to the cellular modem 130 by the second IS barrier circuit 120. At least one LED 155 is coupled to the microcontroller 140 through at least one infallible resistor 175. The LED is used for trouble shooting and indicating the health of cellular modem 130. The SIM card 125 and LED 155 are in a non-potted area 148 of the PCB. Instead, a visible light transparent SIM card access cover (transparent cover) 152 is over the SIM card 125 and over the LED 155 having a hinge pivoted to the encapsulation separator 116 for lifting the transparent cover 152 to expose the SIM card 125 for providing access thereto, such as for replacing the SIM card, changing cellular service provider, or obtaining the SIM ICCID number. The encapsulation separator 216 comprises a material that is different from the encapsulation material 142, such as polycarbonate.

Figure 2:
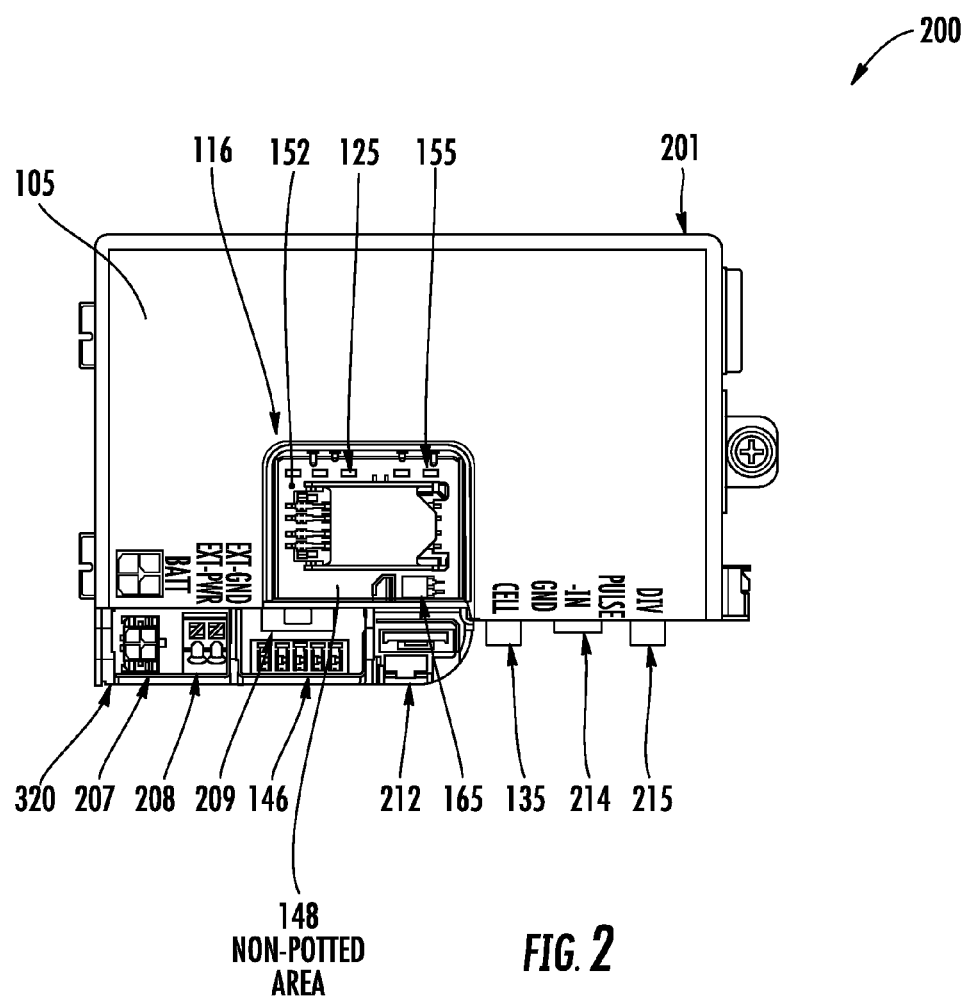
FIG. 2 is depiction of an example packaged cellular modem system, according to an example embodiment.

FIG. 2 is a depiction of an example packaged cellular modem system (modem system) 200. Modem system 200 is designed for an intrinsic safe environment and includes a case 201, connector cover 320, encapsulation separator 116, and a transparent cover 152 over the SIM card 125 and the LED 155. The encapsulation separator 116 functions as separator/barrier for the encapsulation material 142 during filling of the encapsulation material to prevent the non-potted area 148 corresponding to the PCB board area of the SIM card 125 and LEDs 155 from receiving encapsulation material 142. As with modem system 100, modem system 200 provides convenient access to the SIM card 125 and SIM card connector 126 and IO connectors 146 shown as RS232/485 connectors, and convenient restricted access to the metrology jumper 165. The connector cover is shown as 320, battery 207, external power connection as 208, Jumper RS232/485 209 (for the customer to select between RS232 and RS 485 functionality) with its jumper cover there over, CMOS circuits (as a communication interface), a jumper is 212 (as a power switch; turned on during install), and antenna is 135. A pulse input is 214, diversity antenna (antenna div) is 215, and an encapsulation separator 116 separates the potting and non-potting area of PCB 105.

Figure 3A:
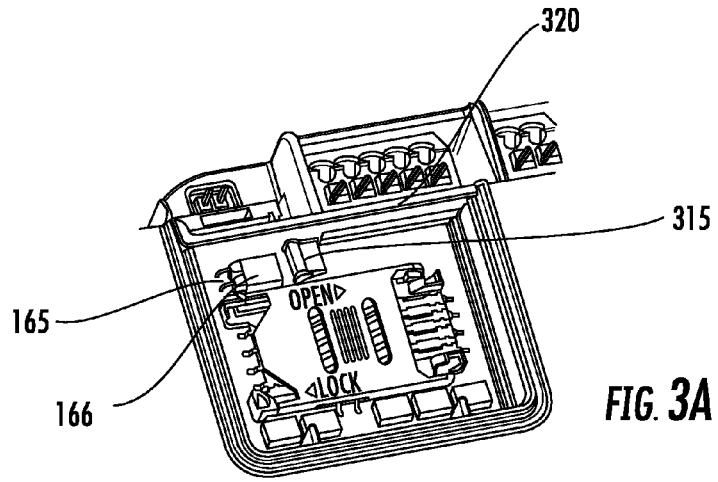
FIG. 3A-C show access features of a disclosed metrology jumper, according to an example embodiment.
Figure 3B:
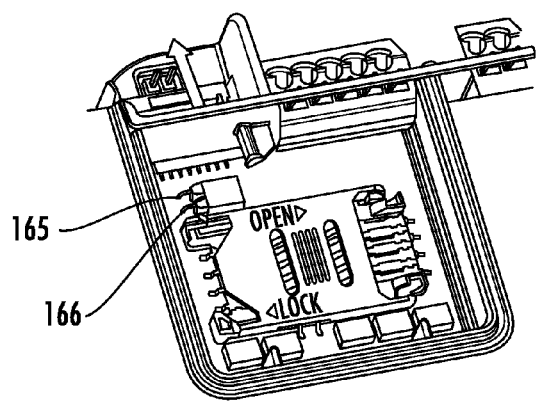
Figure 3C:
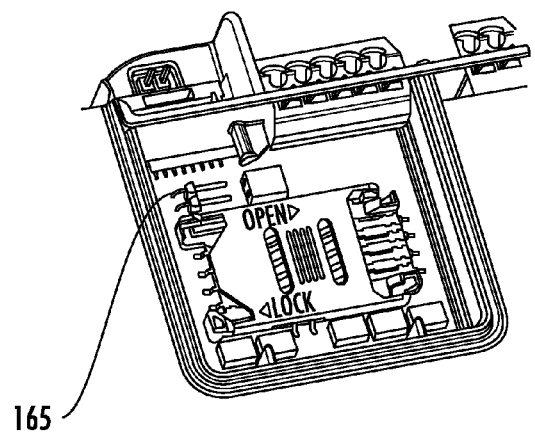

FIGS. 3A-C show access features of a disclosed metrology jumper 205. The metrological jumper 205 access is for configuration without disassembling the electronics assembly from the enclosure. The metrology jumper 165 having a jumper cover 166 thereon is placed at an accessible side of the enclosure so that it is accessible for configuration by breaking the metrology seals (see metrology seals 311 and 312 in FIG. 4A and FIG. 6 described below) and removing the connector cover 320 since in the connector cover 320 an inbuilt feature 315 is provided such that it cannot be accessible when connector cover 320 is assembled with the case and is sealed by the metrology authority. As shown in FIG. 3A, the inbuilt feature 315 in the connector cover 306 restricts access to metrology jumper 165. The connector cover 320 can thus be removed by breaking the metrology seals 311, 312. FIG. 3B shows the connector cover 320 can be removed by breaking the metrology seals 311, 312 on the connector. As shown in FIG. 3C, after the connector cover 206 is removed by breaking the metrology seal 311, 312 on connector and removing then jumper cover 166 the metrology jumper 165 is now accessible (for enabling the removing the shorting bar to allow configuration after removal).

Figure 4A:
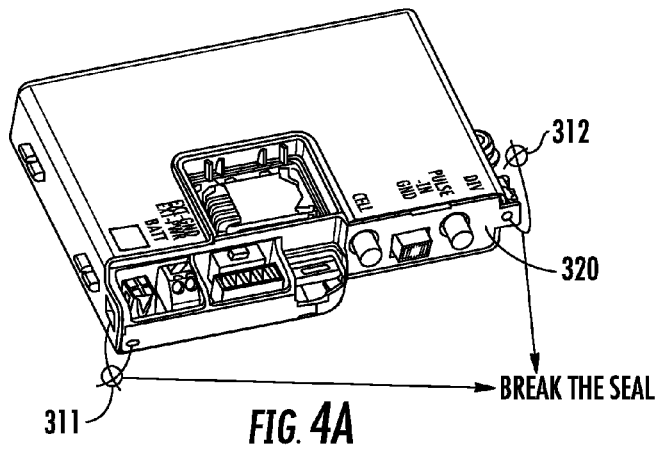
FIG. 4A-C show metrology jumper access including connector cover removal for a disclosed cellular modem system.
Figure 4B:
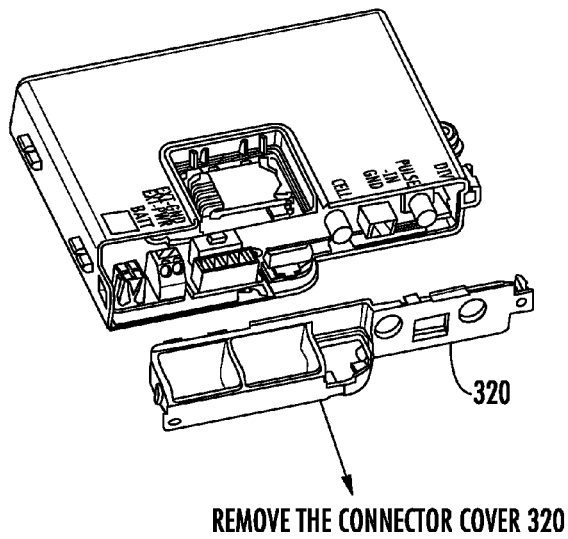
Figure 4C:
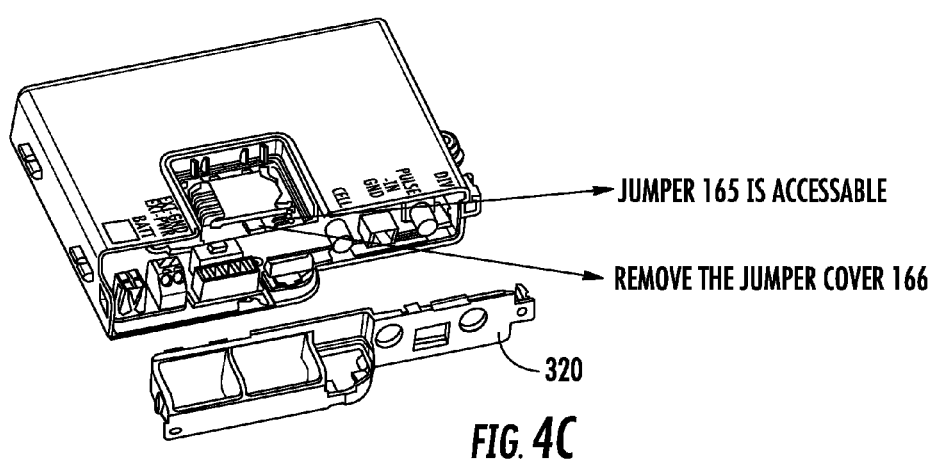

FIG. 4A-C show metrology jumper access including connector cover 320 removal for a disclosed cellular modem system. FIG. 4A shows the seals 311 and 312 that will be broken. FIG. 4B shows removal of the connector cover 320 that is enabled by breaking the seals 311 and 312 shown in FIG. 4A. As shown in FIG. 4C, after removing the jumper cover 166, the metrology jumper 165 becomes accessible.

Figure 5:
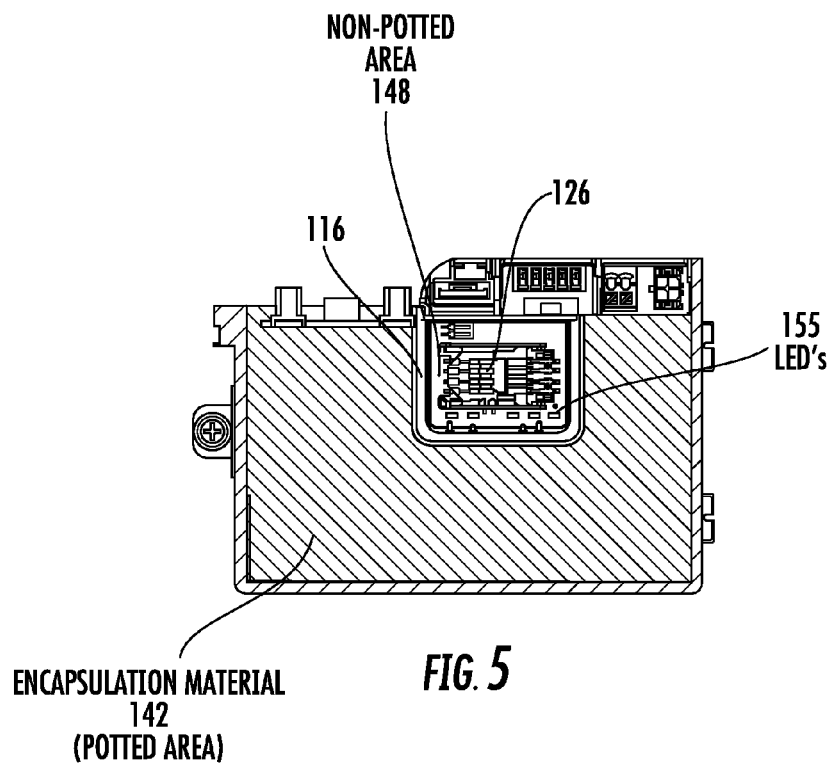
FIG. 5 shows an encapsulation/potted section view of a disclosed cellular modem system in which SIM card holder and LED's are not potted.
Figure 6:
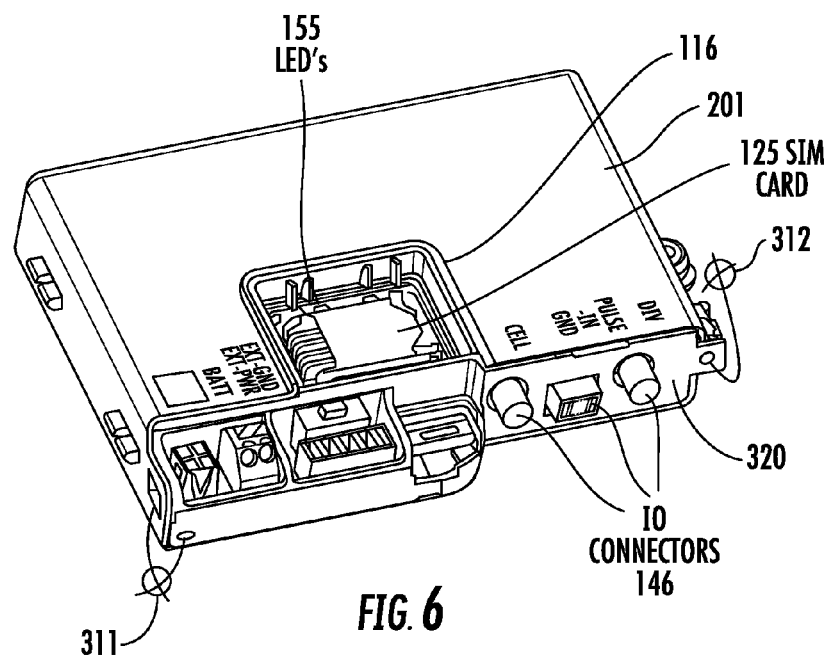
FIG. 6 shows all IO connectors on one side of a cellular modem system.

FIG. 5 shows an encapsulation/potted section view of a disclosed cellular modem system. Encapsulation material 142 is provided in the potted area to meet the IS requirement. The SIM card connector 126 and LEDs 155 are shown in the non-potted area 148 to allow easy access to the SIM card (after it is seated in the SIM card connector 126) and for the LEDs 155 to be visible to show the health of modem and for a diagnostic purpose. FIG. 6 shows all IO connectors 146 on one side of a cellular modem system. All IO connectors 146 are provided on one side of the cellular modem system for easy cable connection and accessibility.

Benefits of disclosed cellular modem systems include the SIM card 125 can be changed without opening the enclosure. Ease of operation and connectivity for the metrology jumper. All IO connectors 146 being on one side make it convenient to make IO connections. The visible LEDs 155 allows a user to know health of the modem device and for trouble shooting.

Disclosed embodiments can be applied to generally to any industrial cellular modem. For example, as an industrial modem in wireless communications with a gas meter that provide synchronized gas day meter reading and interval data to meter data management systems and AutoSol Enterprise Server (AES).

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

The invention claimed is:

1. A packaged cellular modem system (modem system), comprising:
   a printed circuit board (PCB) upon which said modem system is configured on;
   at least one capacitor having electrodes coupled for receiving power from a DC power source, a DC-to-DC converter having inputs is coupled to said electrodes, a cellular modem coupled to an output of said DC-to-DC converter and coupled to an antenna through a first intrinsic safety (IS) barrier circuit, and a second IS barrier circuit coupled to an output of said cellular modem;
   a microcontroller control section including a microcontroller is coupled to a boost regulator having an output coupled to said electrodes for receiving power, and a metrology jumper coupled between said microcontroller and a ground pin;
   input/output (IO) connectors coupled to said cellular modem;
   an encapsulation material providing a potted area of said PCB which pots said capacitor, said DC-to-DC converter, said cellular modem, said second IS barrier circuit, and said microcontroller control section;
   a Subscriber Identity Module (SIM) card inserted into a SIM connector that is coupled to said cellular modem by said second IS barrier circuit;
   LED's coupled to said microcontroller,
   wherein said SIM card and said LEDs are in a non-potted area of said PCB;
   a visible light transparent SIM card access cover (transparent cover) over said SIM card and over said LEDs having a hinge pivoted to an encapsulation separator for lifting said transparent cover to expose said SIM card for providing access thereto.

2. The modem system of claim 1, wherein said capacitor comprises a supercapacitor.

3. The modem system of claim 1, wherein all said IO connectors are located on one side of said modem system.

4. The modem system of claim 1, wherein said metrology jumper is accessible for configuration by breaking a metrology seal and removing a connector cover that is over said metrology jumper.

5. The modem system of claim 1, wherein said encapsulation separator is configured including a sufficient height to function as a barrier for a filling process for applying said encapsulation material.

6. The modem system of claim 1, wherein said LED's are coupled to said microcontroller through at least one infallible resistor.

7. The modem system of claim 1, further comprising an outer case having a cutout which exposes said non-potted area of said PCB.

8. The modem system of claim 7, further comprising a connector cover secured to said outer case by metrology seals, wherein said connector cover is removable by breaking said metrology seals.

9. The modem system of claim 1, wherein said encapsulation separator comprises a material different from said encapsulation material.

10. A packaged cellular modem system (modem system), comprising:
- a printed circuit board (PCB) upon which said modem system is configured on;
  - at least one supercapacitor having electrodes coupled for receiving power from a DC power source, a DC-to-DC converter having inputs is coupled to said electrodes, a cellular modem coupled to an output of said DC-to-DC converter and coupled to an antenna through a first intrinsic safety (IS) barrier circuit, and a second IS barrier circuit coupled to an output of said cellular modem;
  - a microcontroller control section including a microcontroller is coupled to a boost regulator having an output coupled to said electrodes for receiving power, and a metrology jumper coupled between said microcontroller and a ground pin;
  - input/output (IO) connectors coupled to said cellular modem, wherein all said IO connectors are located on one side of said modem system;
  - an encapsulation material providing a potted area of said PCB which pots said supercapacitor, said DC-to-DC converter, said cellular modem, said second IS barrier circuit, and said microcontroller control section;
  - a Subscriber Identity Module (SIM) card inserted into a SIM connector that is coupled to said cellular modem by said second IS barrier circuit;
  - LED's coupled to said microcontroller,
  - wherein said SIM card and said LEDs are in a non-potted area of said PCB;
  - a visible light transparent SIM card access cover (transparent cover) over said SIM card and over said LEDs having a hinge pivoted to an encapsulation separator for lifting said transparent cover to expose said SIM card for providing access thereto.

11. The modem system of claim 10, wherein said metrology jumper is accessible for configuration by breaking a metrology seal and removing a connector cover that is over said metrology jumper.

12. The modem system of claim 10, wherein said encapsulation separator is configured including a sufficient height to function as a barrier for a filling process for applying said encapsulation material.

13. The modem system of claim 10, wherein said LED's are coupled to said microcontroller through at least one infallible resistor.

14. The modem system of claim 10, further comprising an outer case having a cutout which exposes said non-potted area of said PCB.

15. The modem system of claim 14, further comprising a connector cover secured to said outer case by metrology seals, wherein said connector cover is removable by breaking said metrology seals.

* * * * *